(12) United States Patent
Meier

(10) Patent No.: US 8,061,764 B2
(45) Date of Patent: Nov. 22, 2011

(54) WORKING MACHINE AND EMERGENCY LOWERING SYSTEM

(75) Inventor: Simon Meier, Memmingon (DE)

(73) Assignee: Liebherr-Hydraullikbagger GmbH, Kirchdorff/Iller (DE)

( * ) Notice: Subject to any disclaimer, the term of this patent is extended or adjusted under 35 U.S.C. 154(b) by 406 days.

(21) Appl. No.: 12/384,918

(22) Filed: Apr. 10, 2009

(65) Prior Publication Data

US 2009/0256394 A1    Oct. 15, 2009

(30) Foreign Application Priority Data

Apr. 11, 2008 (DE) ................ 20 2008 005 035 U

(51) Int. Cl.
*B66C 13/54* (2006.01)
*B62D 33/067* (2006.01)
*E02F 9/16* (2006.01)
(52) U.S. Cl. ............... 296/190.05; 180/89.14
(58) Field of Classification Search .......... 180/89.13, 180/89.14, 89.15; 296/190.01, 190.04, 190.05
See application file for complete search history.

(56) References Cited

U.S. PATENT DOCUMENTS

| | | | | |
|---|---|---|---|---|
| 2,143,983 A | * | 1/1939 | Howell | 180/54.1 |
| 2,349,284 A | | 5/1944 | Kinzelman | |
| 3,933,262 A | * | 1/1976 | Cresp | 414/695 |
| 3,957,165 A | * | 5/1976 | Smith | 414/460 |
| 4,141,591 A | * | 2/1979 | Spicer | 298/17.6 |
| 5,368,119 A | * | 11/1994 | Nystrom | 180/89.14 |
| 7,419,023 B2 | * | 9/2008 | Mieger | 180/89.13 |
| 2010/0264694 A1 | * | 10/2010 | Crawford | 296/190.05 |

FOREIGN PATENT DOCUMENTS

| | | | |
|---|---|---|---|
| DE | 202004019708 | | 5/2006 |
| EP | 0118340 | | 9/1984 |
| EP | 1300595 | | 6/2006 |
| GB | 1488810 | | 10/1977 |
| JP | 62008994 A | * | 1/1987 |
| JP | 2007106563 A | * | 4/2007 |
| JP | 2007205100 A | * | 8/2007 |
| JP | 2008002178 A | * | 1/2008 |
| JP | 2009190825 A | * | 8/2009 |
| JP | 2009256102 A | * | 11/2009 |
| JP | 2010116690 A | * | 5/2010 |

* cited by examiner

*Primary Examiner* — Dennis Pedder
*Assistant Examiner* — Paul Chenevert
(74) *Attorney, Agent, or Firm* — Dilworth & Barrese, LLP.

(57) ABSTRACT

The present invention relates to a working machine, in particular a traveling material-handling machine, in particular a hydraulic excavator, comprising a basic machine, a cabin and a cabin arm pivotally mounted on the basic machine, by means of which the position of the cabin with respect to the basic machine can be varied, wherein the cabin arm can be swivelled with respect to the basic machine about a horizontal axis by means of at least one hydraulic actuator, and wherein the cabin is pivotally mounted on the cabin arm via a hydraulic inclination adjustment device. In accordance with the invention, the cabin includes an emergency lowering system, in which an inclination emergency valve is provided for the inclination adjustment device of the cabin, which in a case of emergency lowering provides for alignment of the cabin into a normal position.

19 Claims, 3 Drawing Sheets

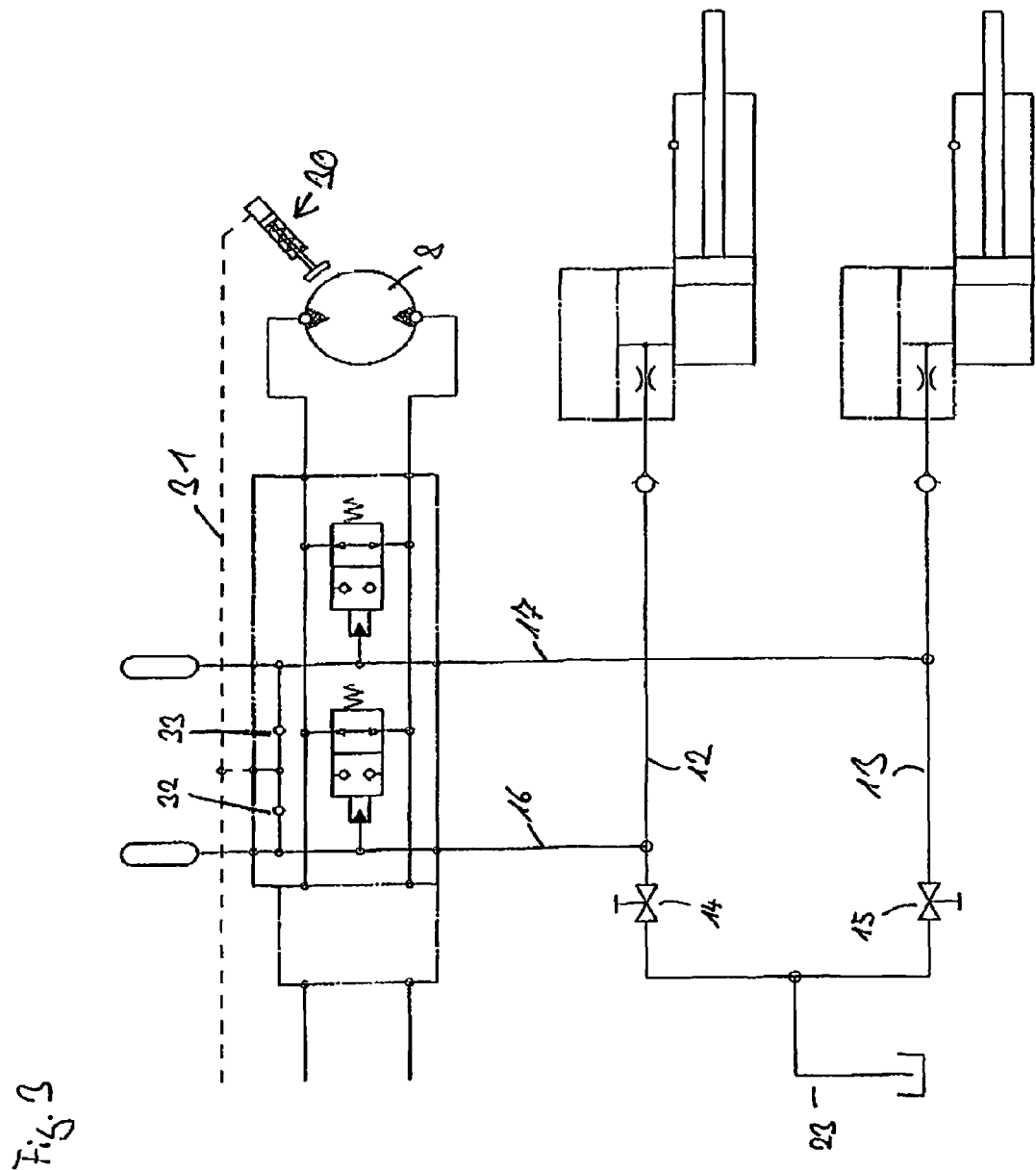

WORKING MACHINE AND EMERGENCY LOWERING SYSTEM

BACKGROUND OF THE INVENTION

The present invention relates to a working machine, in particular a traveling material-handling machine, in particular a hydraulic excavator, comprising a basic machine, a cabin and a cabin arm pivotally mounted on the basic machine, by means of which the position of the cabin with respect to the basic machine can be varied, wherein the cabin arm can be swivelled with respect to the basic machine about a horizontal axis by means of at least one hydraulic actuator, and wherein the cabin is pivotally mounted on the cabin arm via a hydraulic inclination adjustment device.

Such working machine is known from DE 20 2004 019 708 U1.

In such working machines, it is possible to vary the position of the cabins with respect to the basic machine by means of the cabin arm, so that an operator always has an optimum view of the working area and/or the tool of the working machine. When the cabin arm is swivelled, the cabin would be inclined with respect to the cabin arm without a corresponding change in its alignment. By means of the inclination adjustment device, the alignment of the cabin now can be varied or adapted correspondingly, in order to maintain the cabin in its normal position, in which the cabin floor is aligned substantially horizontally. In addition, the cabin can also be aligned such that the cabin floor is inclined with respect to the horizontal, so as to provide the operator with a better downward or upward view due to the inclined arrangement of the cabin.

The cabin arm usually includes an emergency lowering system, by means of which the cabin arm with the cabin pivotally mounted thereon can safely be lowered in the case of a failure of the cabin arm hydraulics, so that the operator can easily get out of the cabin.

In known working machines, however, this involves the problem that the angle of inclination of the cabin with respect to the attachment on the cabin arm is determined by the inclination adjustment device, so that when the cabin arm is swivelled down in a case of emergency lowering, the inclination of the cabin is varied. As a result, the cabin can have a considerable inclination when being lowered, whereby the operator is endangered.

SUMMARY OF THE INVENTION

Therefore, it is the object of the present invention to provide a safer emergency lowering system for such working machine.

In accordance with the invention, this object is solved by a working machine according to the description herein. The working machine of the invention, in particular a traveling material-handling machine, in particular a hydraulic excavator, comprises a basic machine, a cabin and a cabin arm pivotally mounted on the basic machine, by means of which the position of the cabin with respect to the basic machine can be varied. The cabin arm can be swivelled with respect to the basic machine about a horizontal axis by means of at least one hydraulic actuator, wherein the cabin is pivotally mounted on the cabin arm via a hydraulic inclination adjustment device. In accordance with the invention, the working machine now includes an emergency lowering system for the cabin, in which an inclination emergency valve is provided for the inclination adjustment device of the cabin, which in a case of emergency lowering provides for an alignment of the cabin into a normal position. In this way, it is ensured that in a case of emergency lowering the cabin is moved into the normal position, in which the cabin floor is aligned substantially horizontally, so that in a case of emergency lowering the cabin arm and the cabin there is no risk of injury for the operator due to an unintentional inclination of the cabin out of the normal position.

The emergency lowering system of the invention advantageously can be used with any working machine, and in particular material-handling machines such as for wood, scrap or any other goods as well as excavators and cranes particularly advantageously can be equipped with such emergency lowering system. Beside the cabin arm, the working machine advantageously furthermore can include a boom with a working tool such as a grab, a bucket or a hook which is pivotally mounted on the basic machine. Furthermore, the working machine advantageously can include a traveling undercarriage and an uppercarriage rotatably arranged on the undercarriage about a vertical axis of rotation, wherein the cabin arm and the boom advantageously are pivotally mounted on the uppercarriage.

In accordance with the invention, the inclination emergency valve for the inclination adjustment device advantageously is controlled hydraulically via the pressure in the emergency drain line of the hydraulic actuator of the cabin arm. This provides for a both safe and reliable activation of the inclination emergency valve. The inclination emergency valve automatically provides for an alignment of the cabin into a normal position, when emergency lowering of the cabin arm is activated, without the operator having to separately activate the inclination emergency valve for this purpose. In particular, there is no need for a separate emergency drain cock for the inclination adjustment device. In addition, the activation of the inclination emergency valve via the pressure in the emergency drain line also allows an alignment of the cabin into the normal position when a tube of the emergency drain line bursts and an unintentional emergency lowering is activated thereby. The hydraulic activation allows a both safe and simple construction, whereas an electronic activation would be much more costly to realize.

Advantageously, the emergency drain line and/or the control input of the inclination emergency valve is connected with a hydraulic accumulator. Advantageously, the same is charged when lifting the cabin and is drained in a case of emergency lowering. In this way, it is ensured that in a case of emergency lowering the inclination emergency valve is not activated too fast, and thus ensures a controlled movement of the cabin.

In accordance with the invention, the cabin advantageously is pivotally mounted on a pivot point arranged above its center of gravity, so as to hang on the cabin arm, wherein the inclination emergency valve enables the inclination adjustment of the cabin with respect to the cabin arm in a case of emergency lowering, so that the cabin is aligned in its normal position by gravity. In a case of emergency lowering, the emergency inclination valve of the invention thus merely ensures that the inclination adjustment device no longer determines the alignment of the cabin with respect to the cabin arm, but the cabin can substantially freely swing about its pivot point. When the cabin arm now is lowered in a case of emergency lowering, the cabin can freely rotate with respect to its attachment on the cabin arm and thus remains in its normal position. Advantageously, an attenuation of the pendular movement of the cabin is provided here, so that the cabin will safely swing back into the normal position, when it is in an inclined position upon activation of emergency lowering.

Advantageously, the inclination emergency valve of the invention comprises a shutoff valve, which is arranged in the hydraulic circuit of the inclination adjustment device between supply line and discharge line of the inclination adjustment deivce and connects the same with each other in a case of emergency lowering. The shutoff valve thus can ensure freewheeling of the inclination adjustment device and hence enables the movement of the cabin with respect to the cabin arm. On the other hand, if there is no case of emergency lowering, the shutoff valve will close, so that the alignment of the cabin with respect to the cabin arm can be adjusted by a corresponding pressurization of the inclination adjustment device, e.g. via a hydraulic pump.

Furthermore advantageously, at least one further inclination emergency valve is provided for the inclination adjustment device of the cabin, which is controlled hydraulically via the pressure in the emergency drain line of a further actuator of the working machine. In particular when the cabin arm is of the multi-link, e.g. two-link type, and each link is movable by means of a hydraulic actuator, an inclination emergency valve for the inclination adjustment device advantageously is provided for each of the hydraulic actuators, which is activated hydraulically via the pressure in the emergency drain line thereof. Hence it is ensured that the cabin is aligned in a normal position, even if only one of the actuators is switched for emergency lowering.

In accordance with the invention, the emergency drain line of the hydraulic actuator of the cabin arm advantageously is connected with a pressure chamber of the hydraulic actuator via a throttle and a check valve and advantageously can be opened via an emergency drain valve. By actuating the emergency drain valve, an operator thus can activate safe lowering of the cabin arm. When the cabin arm is of the multi-link type and has at least one hydraulic actuator for each of the links, the same advantageously each are equipped with a corresponding emergency drain line.

Furthermore advantageously, the inclination adjustment device of the cabin in accordance with the invention includes a hydraulic brake, wherein in a case of emergency lowering the brake pressure is decreased via the emergency drain line of the hydraulic actuator of the cabin arm. As a result, the brake will open in a case of emergency lowering, and the cabin can swing freely. For this purpose, the pressure supply line of the brake advantageously is connected with the emergency drain line of the hydraulic actuator of the cabin arm via a check valve. Thus, when the emergency drain valve in the emergency drain line is opened, the brake pressure will be decreased via the check valve and the emergency drain line towards the hydraulic reservoir. In normal operation, however, the check valve is closed, since the emergency drain line is pressurized via the pressure chamber of the hydraulic actuator.

The present invention furthermore comprises an emergency lowering system for a working machine as described above. In accordance with the invention, this emergency lowering system for the cabin in particular comprises an inclination emergency valve for the inclination adjustment device of the cabin, which in a case of emergency lowering provides for an alignment of the cabin into a normal position. Quite obviously, this provides the same advantages as described above with respect to the working machine. The emergency lowering system also advantageously has the properties as described above.

BRIEF DESCRIPTION OF THE DRAWINGS

The present invention will now be explained in detail with reference to an embodiment and the drawings, in which:

FIG. 3: shows a hydraulic circuit diagram of a further embodiment of the emergency lowering system of the invention.

DESCRIPTION OF THE PREFERRED EMBODIMENTS

Figure 1:
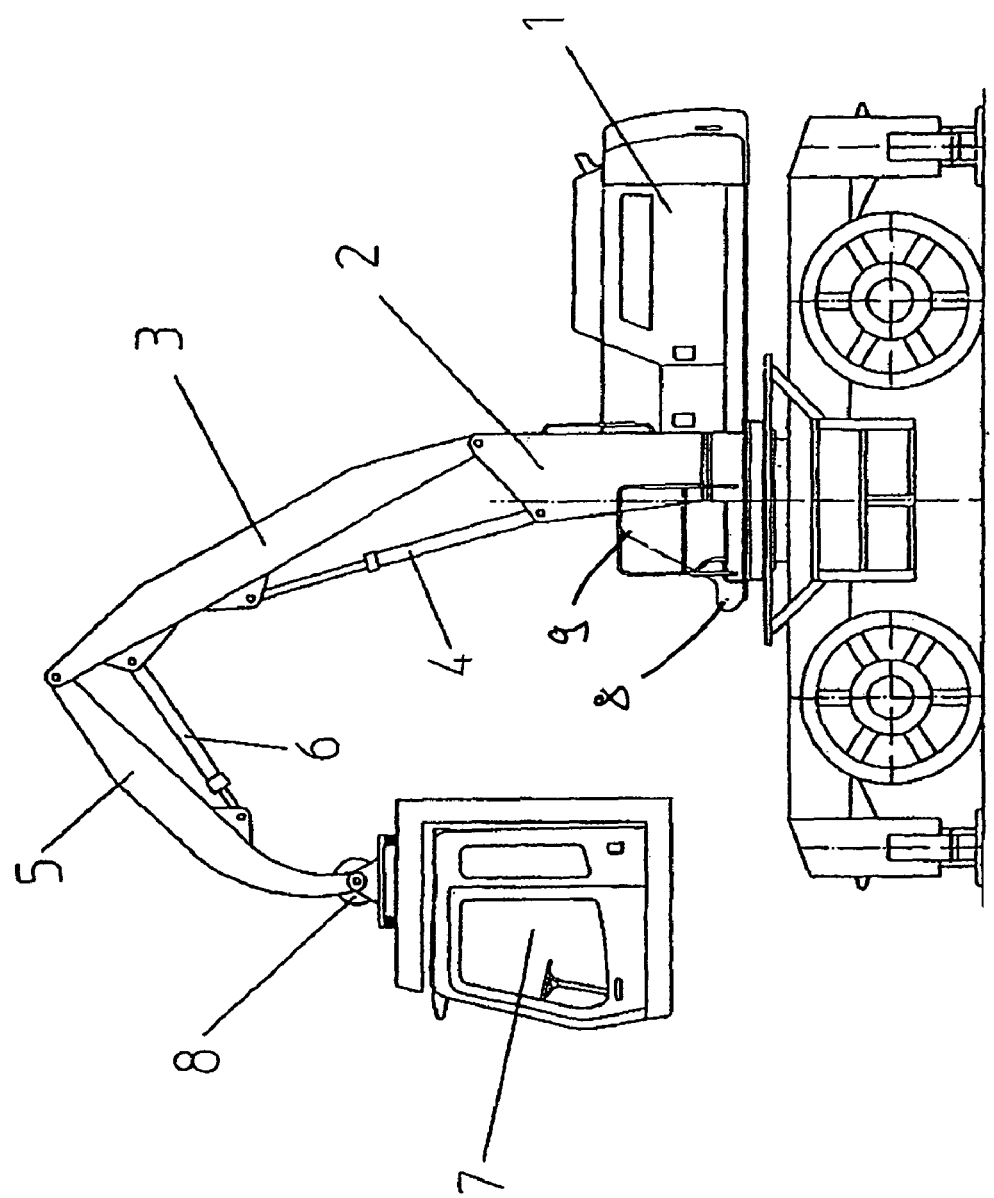
FIG. 1: shows a side view of an embodiment of the working machine of the invention.

FIG. 1 now shows an embodiment of the working machine in accordance with the invention. The same includes a traveling undercarriage with an uppercarriage 1 rotatably mounted on the undercarriage about a vertical axis of rotation, which together form the basic machine. On this basic machine, a working boom not shown in FIG. 1 usually is pivotally mounted, which includes a working tool such as a bucket, a grab or a hook, wherein the working boom can be used e.g. for material handling. In the embodiment shown in FIG. 1, the working boom not shown in the drawing would be pivotally mounted on the pivot points 8 and 9 on the uppercarriage 1. The working machine can be a material-handling machine for instance for wood, scrap or any other goods, a crane or an excavator, in particular a hydraulic excavator.

The working machine includes a cabin 7, from which the working machine is operated by an operator. The cabin 7 is arranged on the basic machine via a cabin arm, wherein the cabin arm provides for a change in position of the cabin 7 with respect to the basic machine. In the embodiment, the cabin arm is pivotally mounted to a mounting portion 2 on the uppercarriage 1 and provides for an adjustment of the cabin 7 with respect to the uppercarriage. In the embodiment, the cabin arm includes an uppercarriage-side link 3 and a cabin-side link 5, which each are adjustable via hydraulic actuators 4 and 6. As hydraulic actuators, hydraulic cylinders are used. As an alternative to the two-link configuration of the cabin arm, a single-link configuration or a configuration with further links can also be used. By means of the actuators 4 and 6, the cabin arm can be swivelled with respect to the basic machine about at least one horizontal axis. At the free end of the cabin arm, the cabin 7 is pivotally mounted, wherein the alignment of the cabin with respect to the cabin arm can be adjusted via a hydraulic inclination adjustment device 8. In this embodiment, the hydraulic inclination adjustment device 8 is formed by a hydraulic motor. Alternatively, inclination adjustment devices with hydraulic cylinders are also possible.

By swivelling the cabin arm, the position of the cabin 7 with respect to the basic machine can now be varied, wherein by means of the hydraulic inclination adjustment device the alignment of the cabin 7 can be maintained in the normal position independent of the position of the cabin arm. It is likewise possible to selectively incline the cabin at an angle, so as to provide for a better downward or upward view of the operator.

In the normal position, the pivot point by which the cabin is pivotally mounted on the free end of the cabin arm, is located directly above its center of gravity, so that when the inclination adjustment device is enabled, the cabin is aligned in the normal position merely by gravity.

In accordance with the invention, an emergency lowering system for the cabin now is provided, which includes an inclination emergency valve for the inclination adjustment device 8 of the cabin, wherein in a case of emergency lowering of the cabin arm the inclination emergency valve provides for an alignment of the cabin into the normal position.

Figure 2:
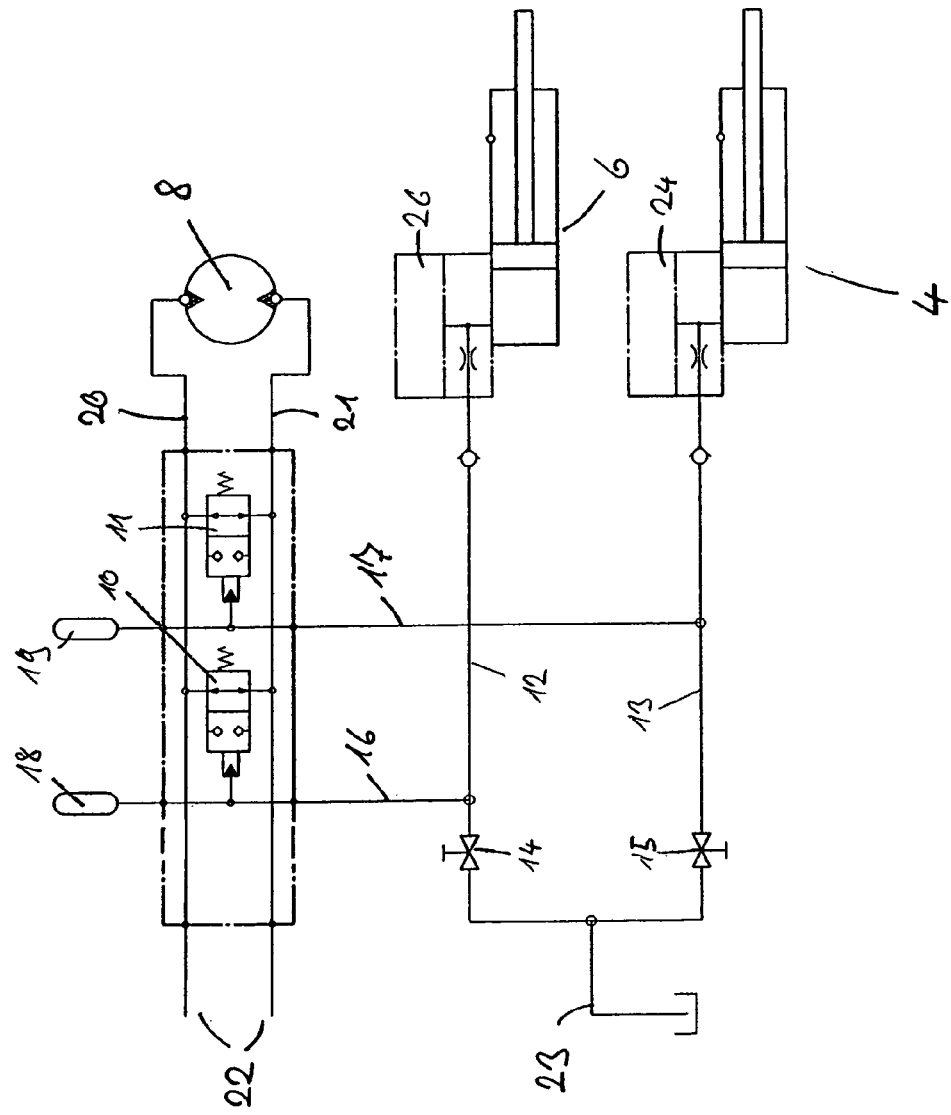
FIG. 2: shows a hydraulic circuit diagram of an embodiment of the emergency lowering system of the invention.

One embodiment of the emergency lowering system of the invention is shown in detail in FIG. 2. For instance in the case of a failure of the hydraulic supply, the emergency lowering system for the cabin arm provides for lowering the cabin arm by draining the hydraulic fluid from the pressure chambers of the hydraulic actuators 4 or 6. Via a throttle and a check valve, the hydraulic cylinder 4 is connected with the emergency drain line 13, which can be opened via an emergency drain valve 15, so that hydraulic fluid can flow off to a hydraulic reservoir 23 in a controlled way. Via a throttle and a check valve, the hydraulic cylinder 6 also is connected with the emergency drain line 12, which can be opened via an emergency drain valve 14, so that hydraulic fluid likewise can flow off into the hydraulic reservoir 23. Furthermore, the hydraulic cylinders 4 and 6 include load holding valves 24 and 26.

The inclination adjustment device 8 of the cabin 7 of the working machine of the invention is formed by a hydraulic motor, whose supply lines 20 and 21 operate as supply line or as discharge line, depending on the direction of movement. The hydraulic motor 8 is pressurized via a hydraulic pressure supply 22, whereby the inclination of the cabin 7 with respect to the cabin-side link 5 of the cabin arm, on which the cabin 7 is suspended, is determined. In accordance with the invention, an inclination emergency valve 10 is provided in the hydraulic circuit of the inclination adjustment device 8, which provides for an alignment of the cabin into the normal position in an emergency lowering case of the actuator 6. Furthermore, another inclination emergency valve 11 is provided, which in an emergency lowering case of the actuator 4 likewise provides for an alignment of the cabin into the normal position.

The inclination emergency valves 10 and 11 are configured as shutoff valves, which each are arranged between the supply lines 20 and 21 of the inclination adjustment device 8 and short the same in a case of emergency lowering, whereas they close in normal operation. In a case of emergency lowering, the inclination adjustment device 8 therefore is in a freewheeling position, so that the cabin can swing into its normal position by gravity. While the cabin arm thus swivels downwards during emergency lowering, the cabin remains in its normal position during this movement and moves the hydraulic motor 8, which thereby operates as freewheeling pump. This prevents the cabin 7 from being swivelled when the cabin arm is swivelled down. If the inclination adjustment device is not realized by a hydraulic motor, as shown in the embodiment, but by a hydraulic cylinder, the inclination emergency valve of the invention advantageously will correspondingly short the respective pressure chambers of the hydraulic cylinders, in order to provide for free swinging of the cabin about its point of suspension.

In accordance with the invention, the control input of the inclination emergency valve 10 is connected with the emergency drain line 12 of the actuator 6 via a control line 16, and the control input of the inclination emergency valve 11 is connected with the emergency drain line 13 of the actuator 4 via a control line 17. Furthermore, the emergency drain line 12 and the control line 16 are connected with a first hydraulic accumulator 18, the control line 17 and hence the emergency drain line 13 with a second hydraulic accumulator 19. When lifting the cabin 7 by pressurizing the pressure chambers of the hydraulic cylinders 4 and 6, the hydraulic accumulators 18 and 19 are charged via the emergency drain lines, whereby pressure is built up in the control lines 16 and 17, which switches the two inclination emergency valves 10 and 11 into their shutoff position. When actuating the emergency drain valve 14, which for instance is configured as a manually operable emergency drain cock, or in the case of a burst tube of the emergency drain line 12, the pressure in the control lines 16 will be decreased, whereby the inclination emergency valve 10 will open and thus switch the inclination adjustment device 8 to freewheeling. The inclination emergency valve 11 likewise will open, when the pressure in the control line 17 drops due the emergency drain valve 15 opening or due to a burst tube in the emergency drain line 13. The hydraulic accumulators 18 and 19 ensure slow opening of the inclination emergency valves 10 and 11, so that the cabin 7 will not abruptly swing out, even if it has a certain inclination upon activation of the emergency lowering case, but is safely lowered into its normal position.

FIG. 3 shows another embodiment of the emergency lowering system of the invention, which in addition to the components described already with reference to FIG. 2 furthermore includes a hydraulic brake 30 of the inclination adjustment device 8. By means of this hydraulic brake 30, the inclination adjustment device 8 and hence the inclination adjustment of the cabin can be braked or fixed. To provide for free swinging of the cabin in an emergency lowering case in accordance with the invention, the brake pressure is decreased in an emergency lowering case via the emergency drain lines 12 and 13 of the hydraulic actuators of the cabin arm. For this purpose, the pressure supply line 31 of the hydraulic brake 30 is connected with the emergency drain line 12 via a check valve 32 and with the emergency drain line 13 via a check valve 33. The connection between the check valves 32, 33 and the emergency drain lines 12, 13 is effected via the control lines 16, 17 of the inclination emergency valves 10, 11. In a case of emergency lowering the cabin, the brake pressure of the brake 30 therefore is decreased towards the hydraulic reservoir 23 by means of the check valves 32, 33, when the emergency drain valves 14, 15 are opened. As a result, the brake will open in a case of emergency lowering, so that the cabin can freely swing as described. In normal operation, on the other hand, the check valves 32 and 33 are closed, since the emergency drain lines 12 and 13 are pressurized via the pressure chambers of the hydraulic cylinders 6 and 4. The check valves 32 and 33 form one unit with the inclination emergency valves, so that the emergency lowering system of the invention can easily be integrated into the cabin arm hydraulic system.

In accordance with the invention, a both safe and simple emergency lowering system is realized, which is composed of hydraulic components alone. By activating the inclination emergency valves via the pressure in the emergency drain lines, a complicated emergency lowering operation with an additional emergency drain cock for the inclination adjustment device 8 can be omitted. Furthermore, the cabin is automatically moved into the normal position not only in a case of emergency lowering activated by the operator, but also in the case of a burst tube in the emergency lowering system.

The invention claimed is:
1. A working machine comprising a basic machine, a cabin and a cabin arm pivotally mounted on the basic machine, by which the position of the cabin with respect to the basic machine can be varied, wherein the cabin arm can be swivelled with respect to the basic machine about a horizontal axis by means of at least one hydraulic actuator, the cabin is pivotally mounted on the cabin arm via a hydraulic inclination adjustment device, and
    an emergency lowering system for the cabin, in which an inclination emergency valve is provided for the inclination adjustment device of the cabin, which in a case of emergency lowering provides for an alignment of the cabin into a normal position.

2. The working machine according to claim 1, wherein the cabin is pivotally mounted on a pivot point arranged above the center of gravity to hang on the cabin arm, and the inclination emergency valve enables the inclination adjustment of the cabin with respect to the cabin arm in a case of emergency lowering, so that the same is aligned into the normal position by gravity.

3. The working machine according to claim 1, wherein the inclination emergency valve comprises a shutoff valve, which is arranged in the hydraulic circuit of the inclination adjustment device between feed line and discharge line of the inclination adjustment device and connects the same with each other in a case of emergency lowering.

4. The working machine according to claim 1, wherein at least one further inclination emergency valve is provided for the inclination adjustment device of the cabin, which is controlled hydraulically via the pressure in the emergency drain line of a further actuator of the working machine.

5. The working machine according to claim 1, wherein the emergency drain line of the hydraulic actuator of the cabin arm is connected with a pressure chamber of the hydraulic actuator via a throttle and a check valve and advantageously can be opened via an emergency drain valve.

6. The working machine according to claim 1, wherein the inclination adjustment device of the cabin includes a hydraulic brake, and in an emergency lowering case the brake pressure is decreased via the emergency drain line of the hydraulic actuator of the cabin arm, advantageously in that the pressure supply line of the brake is connected with the emergency drain line of the hydraulic actuator of the cabin arm via a check valve.

7. The working machine according to claim 1, wherein at least on of the the emergency drain line and the control input of the inclination emergency valve is connected with a hydraulic accumulator, which advantageously is charged when lifting the cabin and is drained in a case of emergency lowering.

8. The working machine according to claim 7, wherein the cabin is pivotally mounted on a pivot point arranged above the center of gravity to hang on the cabin arm, and the inclination emergency valve enables the inclination adjustment of the cabin with respect to the cabin arm in a case of emergency lowering, so that the same is aligned into the normal position by gravity.

9. The working machine according to claim 8, wherein the inclination emergency valve comprises a shutoff valve, which is arranged in the hydraulic circuit of the inclination adjustment device between feed line and discharge line of the inclination adjustment device and connects the same with each other in a case of emergency lowering.

10. The working machine according to claim 1, wherein the inclination emergency valve is controlled hydraulically via the pressure in the emergency drain line of the hydraulic actuator of the cabin arm.

11. The working machine according to claim 10, wherein the cabin is pivotally mounted on a pivot point arranged above the center of gravity to hang on the cabin arm, and the inclination emergency valve enables the inclination adjustment of the cabin with respect to the cabin arm in a case of emergency lowering, so that the same is aligned into the normal position by gravity.

12. The working machine according to claim 11, wherein the inclination emergency valve comprises a shutoff valve, which is arranged in the hydraulic circuit of the inclination adjustment device between feed line and discharge line of the inclination adjustment device and connects the same with each other in a case of emergency lowering.

13. The working machine according to claim 12, wherein at least one further inclination emergency valve is provided for the inclination adjustment device of the cabin, which is controlled hydraulically via the pressure in the emergency drain line of a further actuator of the working machine.

14. The working machine according to claim 10, wherein at least on of the emergency drain line and the control input of the inclination emergency valve is connected with a hydraulic accumulator, which advantageously is charged when lifting the cabin and is drained in a case of emergency lowering.

15. The working machine according to claim 14, wherein the inclination emergency valve comprises a shutoff valve, which is arranged in the hydraulic circuit of the inclination adjustment device between feed line and discharge line of the inclination adjustment device and connects the same with each other in a case of emergency lowering.

16. The working machine according to claim 15, wherein at least one further inclination emergency valve is provided for the inclination adjustment device of the cabin, which is controlled hydraulically via the pressure in the emergency drain line of a further actuator of the working machine.

17. The working machine according to claim 14, wherein the cabin is pivotally mounted on a pivot point arranged above the center of gravity to hang on the cabin arm, and the inclination emergency valve enables the inclination adjustment of the cabin with respect to the cabin arm in a case of emergency lowering, so that the same is aligned into the normal position by gravity.

18. The working machine according to claim 17, wherein the inclination emergency valve comprises a shutoff valve, which is arranged in the hydraulic circuit of the inclination adjustment device between feed line and discharge line of the inclination adjustment device and connects the same with each other in a case of emergency lowering.

19. The working machine according to claim 18, wherein at least one further inclination emergency valve is provided for the inclination adjustment device of the cabin, which is controlled hydraulically via the pressure in the emergency drain line of a further actuator of the working machine.

* * * * *